United States Patent [19]

McGenity et al.

[11] Patent Number: 5,879,512

[45] Date of Patent: Mar. 9, 1999

[54] PAPER COATING

[75] Inventors: Philip Martin McGenity; Janet Susan Preston, both of Cornwall, United Kingdom

[73] Assignee: ECC Internatinal Ltd., United Kingdom

[21] Appl. No.: 849,680

[22] PCT Filed: Oct. 11, 1996

[86] PCT No.: PCT/GB96/02488

§ 371 Date: Jul. 12, 1997

§ 102(e) Date: Jul. 12, 1997

[87] PCT Pub. No.: WO97/13921

PCT Pub. Date: Apr. 17, 1997

[30] Foreign Application Priority Data

Oct. 13, 1995 [GB] United Kingdom ............... 9520978
Oct. 13, 1995 [GB] United Kingdom ............... 9520986

[51] Int. Cl.$^6$ ............... D21H 19/42; C09C 3/08
[52] U.S. Cl. .......... 162/135; 162/179; 162/168.3; 162/181.8; 162/181.1; 106/31.6; 106/228; 106/243; 252/607; 252/610; 427/391
[58] Field of Search ............... 162/135, 181.1, 162/181.5, 181.6, 181.7, 179, 168.3, 168.2, 181.8; 106/31.6, 31.9, 228, 218, 235, 241, 243, 251, 253, 262, 288; 252/607, 610; 427/391, 361, 351

[56] References Cited

U.S. PATENT DOCUMENTS

| 3,804,656 | 4/1974 | Kaliski et al. ............ 106/308 |
| 3,928,707 | 12/1975 | Lauterbach et al. ............ 428/342 |
| 4,421,660 | 12/1983 | Solc Nee Hajna ............ 252/62.54 |
| 4,619,705 | 10/1986 | Dixon ............ 106/288 |
| 4,676,836 | 6/1987 | Hill et al. ............ 106/243 |
| 4,766,015 | 8/1988 | Nikoloff et al. ............ 427/326 |
| 4,857,110 | 8/1989 | Dessaner et al. ............ 106/211 |
| 4,908,240 | 3/1990 | Auborn et al. ............ 427/391 |
| 5,064,570 | 11/1991 | Rohringer ............ 252/301 |
| 5,663,224 | 9/1997 | Emmons et al. ............ 524/188 |

FOREIGN PATENT DOCUMENTS

| 0026091 | 3/1992 | European Pat. Off. . |
| 0565691 | 11/1993 | European Pat. Off. . |
| 958830 | 4/1994 | Germany . |
| 674876 | 3/1991 | United Kingdom . |
| 1032536 | 11/1991 | United Kingdom . |
| 1056824 | 2/1992 | United Kingdom . |
| WO93/09289 | 10/1993 | WIPO . |

OTHER PUBLICATIONS

"Surfactants & Interfacial Phenomena", 2nd Ed., Ch. 7, Milton J. Rosen, John Wiley & Sons, pp. 276, 300.
"Coating Equipment and Process", George L. Booth, Lockwood Publishing Co., N.Y. (1970) Ch, 1, pp. 1–17.
"Paper Coating Additives", (H. Ray Hall), TAPPI Monograph Series No. 25, Ch. 2, pp. 14–23.
"The Printing Ink Manual", Fifth Edition, Edited By R. H. Leach and R.J. Pierce, Chapman & Hall, London, 1993.

Primary Examiner—Stanley S. Silverman
Assistant Examiner—José S. Fortuna
Attorney, Agent, or Firm—Suzanne Kikel

[57] ABSTRACT

A method of producing a composition for coating fibrous sheet products includes adding a surface treatment agent in an aqueous emulsion or solution form to an aqueous suspension of a dispersed inorganic particulate material comprising kaolin to improve the coating composition, e.g., rheology, and the rotogravure printing process, e.g. runnability. The dispersing agent is polycarboxylate. The surface treatment agent is in a substantially free state, has a hydrophobic group, and is selected from the group consisting of: (i) a long chain fatty acid; (ii) a long chain fatty alcohol; or (iii) an anionic surfactant having a long chain hydrophobic group and a polar group. A hydrophilic adhesive is added to the dispersed aqueous suspension during or while the surface treatment agent is added to the dispersed aqueous suspension. This method is used to produce a coated and a printed coated cellulosic sheet member.

10 Claims, No Drawings

PAPER COATING

This application is a 371 of PCT/GB96/02488 filed on Oct. 11, 1996

BACKGROUND OF THE INVENTION

1. Field of the Invention

This, invention concerns an improved coating composition for use in preparing a coated cellulosic sheet material, for example paper or cardboard, which has special advantages when the coated sheet material is printed by the rotogravure process.

2. Description of the Background Art

Coating compositions for cellulosic sheet materials generally comprise an aqueous suspension of one or more pigments and one or more adhesive materials, together with small amounts of other additives such as rheology modifiers, lubricants etc, The most commonly used pigments are generally natural or synthetic inorganic materials of white colour and of relatively fine particle size distribution such that at least 45% by weight of the particles have an equivalent spherical diameter (esd) smaller than 2 $\mu$m, when measured by a sedimentation method. Examples of pigments which are commonly used in coating compositions for cellulosic sheet materials are kaolin clay, calcined kaolin clay, natural or precipitated calcium carbonate, satin white, calcium sulphate and talc.

The rotogravure printing process is generally most suited to those applications in which a very large number of copies is required to be printed, because the process by which a rotogravure printing cylinder is prepared is expensive relative to the cost of preparing printing plates for use in other methods of printing. A rotogravure printing cylinder has on its surface a matrix of cells or depressions which vary in depth according to the amount of ink which is required to be transferred to the paper from each individual cell. The surface of the cylinder is initially smooth and highly polished, arid the matrix of cells on the surface is prepared by an expensive photographic etching process. Because of the large number of copies to be printed, it is generally desirable to run the printing press at high speed, and this necessitates the use of a printing ink which dries quickly on the paper to avoid "offset", or the transfer of undried printing ink from one sheet of paper to the next. It is therefore desirable to use a printing ink which has a solvent which is more volatile than water. In addition a solvent-based ink generally gives better print quality than a water-based ink. Such volatile solvents are almost always organic and oleophilic.

It has been discovered in the paper coating industry that, when large reels of paper are wound or unwound at high speed, frequent breakages can occur in the web of coated paper. One cause of this is believed to be the relatively high coefficient of friction of the coated surface of certain types of coated paper, which limits the freedom of movement of one turn of a reel of coated paper relative to an adjacent turn.

In order to reduce or eliminate this problem, some operators include in the coating composition from 10% to 45% by weight of talc in the total dry weight of the pigment in the composition. This reduces the coefficient of friction of the surface of the coated paper prepared using the composition and gives it a "slippery" feel. Talc of the required quality is, however, expensive, and in some cases, the slippery surface of the coated paper can cause problems in printing processes in which the paper is used.

It is also known (see for example TAPPI Monograph Series No. 25 "Paper Coating Additives", Chapter 2, "Lubricants" by R. B. Porter, Technical Association of the Pulp and Paper Industry, New York, 1963) to include in a paper coating composition as a lubricant or "levelling agent" a small quantity of a water-soluble soap, such as sodium or ammonium stearate, or of a soap which is insoluble, but dispersible, in water such as calcium or aluminium stearate.

Talc as used in the prior art to assist smoothness arid runnability is expensive.

Providing a paper having a surface which is compatible with the rotogravure printing process required to be operated has been difficult in the prior art. In many cases, there has been an incompatibility which has resulted in a loss of dots making up the required print image.

The present invention concerns the use of a surface treatment agent having hydrophilic and hydrophobic groups in the production of a coating composition for paper and like fibrous sheet materials. Use of such an agent in such compositions for different reasons is known from various prior art references, eg. GB 1,056,824; U.S. Pat. No. 4,908,240; U.S. Pat. No. 4,857,110; U.S. Pat. No. 4,766,015; U.S. Pat. No. 4,676,836; U.S. Pat. No. 3,928,707 and GB 674,876.

However, such references do not teach the production of compositions which solve both the 'runnability' and 'missing dot' problems described above by use of a surface treatment agent (without other measures).

EP-A-0565691 discloses a method whereby a pigment material is treated with a chemical surface treatment agent, e.g. a saturated or unsaturated fatty acid or an amine, prior to the preparation of the paper coating composition. However, in use of such a method, the treated pigment material has to be subsequently dispersed with dispersing agent in an aqueous suspension. Such a process is difficult to carry out satisfactorily because the coated pigment material is not easily dispersed with conventional dispersing agents.

SUMMARY OF THE INVENTION

According to the present invention in a first aspect there is provided a method of producing a coating composition for coating fibrous sheet products which includes the steps of (a) preparing a dispersed aqueous suspension of an inorganic particulate pigment material in an aqueous medium which includes a dispersing agent for the pigment material in the suspension; (b) preparing an aqueous emulsion or solution of a surface treatment agent for the pigment material, the surface treatment agent having a hydrophobic group and being present in a substantially free state and being selected from one or more of:

(i) long chain fatty acids;
(ii) long chain fatty alcohols having from 8 to 18 carbon atoms in their hydrocarbon chain and
(iii) surfactants having a long chain hydrophobic group and a polar group;
c) adding with mixing the aqueous emulsion or solution of the surface treatment agent to the dispersed aqueous suspension of the inorganic particulate material; and
(d) adding to the dispersed suspension formed by step (a) a hydrophilic adhesive and optionally other ingredients required in the paper coating composition.

Desirably step (d) follows step (c).

By a 'substantially free state' is meant a state in which the surface treatment agent is free to bind to the particles of the pigment material as distinct from the prior art wherein, for example, fatty acids are described which have been reacted with nitrogen-containing compounds such as amines or quarternary ammonium compounds and are not therefore free.

According to the present invention in a second aspect there is provided a dispersed slurry of a pigment material suitable for use in a paper coating composition which slurry is prepared by steps (a), (b) and (c) of the method according to the first aspect. The slurry may be in a concentrated form suitable for storage and delivery to a paper coating user, e.g. in a coating plant. For example, the slurry may contain at least 55% by dry weight of solids.

According to the present invention in a third aspect there is provided a coating composition prepared by the method according to the first aspect. The composition may be suitable for coating paper or other cellulosic sheet material.

DETAILED DESCRIPTION OF THE INVENTION

In the method according to the first aspect of the invention step (b) will generally form an emulsion when the surface treatment agent comprises a fatty acid or fatty alcohol and a solution when the surface treatment agent comprises a surfactant. Where the surface treatment agent comprises at least a fatty acid or fatty alcohol step (b) may be carried out by mixing the surface treatment agent(s) into a heated stirred quantity of water. For example, where the surface treatment agent comprises a fatty acid optionally together with an emulsifier, eg. in a weight ratio of from 1:10 to 1:50, it may be suitable to heat the water to a temperature at which the fatty acid or fatty alcohol melts, generally in the range 40° C. to 90° C. The surface treatment agent(s) may form from 10% to 40%, e.g. from 20% to 30%, by weight of the emulsion when formed.

A web of paper coated with a composition according to the third aspect may be reeled and unreeled at high speed with diminished risk of breakage, as compared with webs which have been coated with conventional compositions. Also, it is found that, surprisingly, a web of paper which has been coated with a composition in accordance with the invention gives superior print quality on printing by a rotogravure process, as compared with a web of paper which has been coated with a conventional composition comprising an aqueous suspension of an adhesive, a particulate inorganic pigment and a dispersing agent.

The inorganic particulate material may comprise, for example, a kaolin or china clay, a calcined kaolin, natural or precipitated calcium carbonate, satin white, talc, calcium sulphate or a blend of any two or more of these. The pigment will normally be present in the coating composition in an amount of at least about 45% by weight, based on the total weight of the composition (including water in the composition), and will normally be present in an amount no greater than about 70% by weight.

The amount of adhesive solids present in the composition will vary according to the type of adhesive used and the type of process by which the coated paper is to be printed, but will normally be in the range of from 3% to 30%, preferably 20% or less, by weight based on the dry weight of the pigment. Preferably, the adhesive is a latex in which case it is preferred that the quantity of the latex used is such that the amount of latex solids is in the range from 3% to 6% by weight, based on the weight of dry pigment. The latex may be, for example, a styrene-butadiene latex or an acrylic latex, which may or may not be of the alkali-swelling type. The latex to be employed will normally be one which is in the form of an aqueous emulsion containing about 40% to 60% by weight of latex solids, preferably about 50% by weight of latex solids. Starch is another possible adhesive which may be used in the coating composition of the invention.

The dispersing agent may be of the type conventionally used in coating compositions for cellulosic sheet material, for example, inorganic dispersing agents such as the water soluble salts of polyphosphoric acid or of polysilicic acid, or polycarboxylate dispersing agents such as the water soluble salts of poly(acrylic acid) or of poly(methacrylic acid). Polycarboxylates, e.g. sodium polyacrylate, are preferred. Mixtures of different dispersing agents are also operable. Typically, the amount of the dispersing agent used will be at least 0.05% by weight, based on the weight of dry pigment, and will preferably be no greater than 0.5% by weight, based on the weight of dry pigment, preferably from 0.1% to 0.4% by weight The hydrocarbon chain of the fatty acid should preferably have a length of from 8 to 22 carbon atoms, more preferably from 12 to 22 carbon atoms Preferably, the hydrocarbon chain is linear and saturated. The carboxyl acid is preferably a and the hydrocarbon chain of the fatty alcohol should have from 8 to 18 carbon atoms, preferably from 12 to 18 carbon atoms.

Preferably, the hydrocarbon chain is linear and saturated. The carboxylic acid is preferably a monocarboxylic acid and the alcohol is preferably a monoalcohol. A presently preferred long chain alcohol is cetyl ($C_{16}$) alcohol and a presently preferred long chain fatty acid is, stearic acid. The emulsified long chain fatty acid or alcohol may be formed in step (b) as an emulsion in water of the fatty acid or alcohol with the aid of an emulsifying agent. Thus, for example, the emulsion may be formed by preparing an aqueous mixture of the fatty acid or fatty alcohol and the emulsifying agent, and vigorously agitating the mixture, preferably at an elevated temperature, until a stable emulsion is formed. The emulsion preferably has a mean particle size not greater than 1 μm and a zeta potential in the range of from −30 to −70 mV. An example of a suitable emulsifying agent is a sodium sulphosuccinate dioctyl ester, although other emulsifying agents which are compatible with the fatty acid or alcohol, such as sulphonated alcohol ethoxylates will also be suitable. The amount of emulsifying agent used is typically at least 0.5% by weight, based on the weight of the fatty acid or fatty alcohol, and preferably no greater than 5.0% by weight.

The amount of the emulsified long chain fatty acid or alcohol in the coating composition of the invention is preferably at least 0.5% by weight, based on the weight of dry pigment, and preferably no greater than 5.0% by weight. More preferably, the emulsified long chain fatty acid or alcohol in the coating composition of the invention is present in an amount in the range of from 1.5% to 3.0% by weight, based on the weight of dry pigment.

Where a fatty acid or fatty alcohol is used it is desirably free of multivalent metal ions, e.g. calcium in calcium stearate. Monovalent ions, e.g. sodium stearate, may be used to provide the surfactant.

The said surfactant is preferably anionic. Preferably, it has a least 8 carbon atoms, more preferably at least 12 carbon atoms in its hydrophobic portion. The polar portion of the surfactant may comprise sodium and a sulphur and oxygen containing group, e.g. sulphate. Examples of suitable surfactants are sodium dodecyl sulphate and sodium sulphosuccinate dioctyl ester.

It has surprisingly been discovered that the improvement in the print quality obtained by the gravure process on a sheet material coated with a composition in accordance with the third aspect of the invention is as least as good as the improvement which is obtained when a sheet material is coated in accordance with the method disclosed in EP-A-0565691. The present invention provides an alternative suitable coating composition to those of the type which contain an inorganic pigment which has been surface treated with an amine or quaternary ammonium compound. Furthermore, by dispersing the pigment material before addition of the surface treatment we have found, surprisingly and beneficially, that conventional dispersing agents may be used and the process (of producing a pigment slurry for use in a paper coating composition for use on paper for rotogravure printing giving improved runnability and print quality) is therefore easier and more convenient to apply.

It has been found by the inventors that, in some circumstances, the use of a surfactant in the method according to the first aspect will result in the generation of foam in the coating composition, subsequently formed, with resultant poor runnability of the paper coating machine, arid poor print performance of the coated material. The addition of an anti-foaming agent to the said aqueous emulsion in step (b) or to the aqueous suspension formed in step (c) or to the composition formed in step (d) has been found to alleviate the foaming problem without impairing the capability of the composition to provide a coated sheet material which will give excellent print quality when printed by the gravure process. Anti-foaming agents are well known materials and are exemplified in Chapter 7 (Foaming and Antifoaming by Aqueous Solutions of Surfactants) of the book "Surfactants and Interfacial Phenomena", Second Edition, by Milton J. Rosen, John Wiley & Sons., New York, 1989. Amongst those presently preferred are those comprising finely divided hydrophobic silica dispersed in a silicone oil. Other suitable anti-foamers are those comprising an aqueous emulsion of silicone oil together with other additives.

The minimum amount of anti-foaming agent necessary to avoid foaming will normally be used, in view of the cost of this ingredient. Typically, this will be in the range of from 0.01% to 1.0% by weight, based on the weight of dry pigment.

According to a fourth aspect of the present invention, there is provided a coated cellulosic sheet member prepared by applying a coating composition in accordance with the first aspect of this invention to a surface of a base cellulosic sheet member and permitting said coating to dry.

More details of the manner in which coated sheet members may be prepared can be found in Chapter 1. ("Mineral Pigmented Coatings") of the book "Coating Equipment and processes" by George L. Booth, Lockwood Publishing Co. m Inc., New York, 1970.

Typically, the coated sheet member of the invention has a coat weight in the range of from 4 to $12 m^3 g^{-1}$. The coated sheet member of this aspect of the invention will normally possess a coefficient of friction less than 0.3, although this figure can vary somewhat with base paper type, coat weight and other factors.

According to a fifth aspect of the present invention, there is provided a gravure printing process in which an image is printed onto the surface of a coated sheet member in accordance with the third aspect of the present invention. The gravure printing process is described in general terms at pages 42–52 of the book "The Printing Ink Manual", 5th Ed., edited by R. H. teach and R. J. Pierce, Chapman and Hall, London, 1993.

Embodiments of the present invention will now be described by way of example with reference to the following Examples.

EXAMPLE 1

Five paper coating compositions (A and B being comparative; C, D and E being in accordance with the invention) were prepared according to the recipes given in Table 1 below:

TABLE 1

|  | A | B | C | D | E |
|---|---|---|---|---|---|
| Clay 1 | 100 | 70 | 100 | 100 | 100 |
| Talc 1 | 0 | 30 | 0 | 0 | 0 |
| styrene-butadiene latex adhesive | 5.0 | 5.0 | 5.0 | 5.0 | 5.0 |
| Cetyl alcohol | 0 | 0 | 1.0 | 2.0 | 4.0 |
| Sodium hydroxide | to give pH 8.5 | | | | |
| Water | to 57.0% by weight dry solids | | | | |

The amount of each pigment is given in parts by weight of the total pigment. The amount of the latex adhesive is given as the percentage by weight of latex solids, based on the weight of the dry pigment. The amount of cetyl alcohol is the percentage by weight, based on the weight of the dry pigment.

In the above compositions: Clay 1 was a kaolin clay having a platey particle shape (an aspect ratio of about 50) and a particle size distribution such that 65% by weight consisted of particles having an equivalent spherical diameter smaller than 2 $\mu$m and 40% by weight consisted of particles having an equivalent spherical diameter smaller than 1 $\mu$m. Talc 1 was a paper coating grade talc having a particle size distribution such that 45% by weight consisted of particles having an equivalent spherical diameter smaller than 2 $\mu$m and 25% by weight consisted of particles having an equivalent spherical diameter smaller than 1 $\mu$m. Clay 1 (and each of Clay 2 and Clay 3 referred to hereinafter) was supplied and used as a pre-dispersed slurry containing as an active amount of sodium polyacrylate dispersing agent 0.3% by weight based upon the dry weight of the kaolin clay.

Talc 1 was supplied and used as a pre-dispersed slurry commercially available under the trade designation FINNTALC C10. The cetyl ($C_{16}$) alcohol was added as an emulsion which was prepared by heating 800 g of water to 80° C. and adding to this 10 g of a sodium sulphosuccinate dioctyl ester emulsifying agent, which is marketed under the trade name "AEROSOL OT". To this mixture was added 200 g of cetyl alcohol. The mixture was vigorously stirred during the addition of the cetyl alcohol, and for a further 10 minutes thereafter, while the temperature fell to 4° C. The emulsion so formed was then allowed to stand until it had cooled to room temperature. Analysis using a Malvern Zetasizer showed that the emulsion had a mean particle size of 0.35 $\mu$m and a zeta potential of −70 mV.

The compositions were applied to a rotogravure base paper of weight 39 g.m$^{-2}$, using a laboratory coating machine of the type described in British Patent Specification No. 1032536 at a paper speed of 400 m.min$^{-1}$ and a blade holder angle of 45°. Coatings were applied to sheets of the base paper at different weights per unit are in the range from about 5 to 10 g.m$^{-2}$ by adjusting the loading on the blade. Each sheet of coated paper was conditioned for 24 hours at 23° C. and 50% relative humidity, and were then calendered by 10 passes through a Perkins laboratory supercalender at a temperature of 65° C., a pressure of 69 bar and a speed of 36 m.min$^{-1}$. The sheets of calendered coated paper were tested for gloss, coefficient of friction, gravure print quality (% missing dots) and print density, the results for gloss, gravure print quality and print density being plotted graphically against coat weight, and the result corresponding to a coat weight of 7 g.m$^{-2}$ being found by interpolation. In the case of the coefficient of friction, measurements were made at a coat weight which was as near as possible to 7 g.m$^{-2}$ The results obtained are set forth in Table 2 below:

TABLE 2

| Composition | Gloss | Coefficient of Friction | % Missing Dots | Print Density |
|---|---|---|---|---|
| A | 57 | 0.274 | 1.4 | 2.01 |
| B | 58 | 0.223 | 1.1 | 1.97 |
| C | 59 | 0.256 | 1.1 | 2.01 |
| D | 59 | 0.235 | 0.9 | 1.98 |
| E | 59 | 0.241 | 0.4 | 1.92 |

EXAMPLE 2

Three further paper coating compositions (F and G being comparative and H being in accordance with the invention) were prepared according to the recipes given in Table 3 below:

TABLE 3

| | F | G | H |
|---|---|---|---|
| Clay 1 | 0 | 0 | 100 |
| Clay 2 | 100 | 80 | 0 |
| Talc 1 | 0 | 20 | 0 |
| Cetyl alcohol | 0 | 0 | 2.0 |
| Styrene-acrylic (alkali-swellable) latex adhesive | 5.0 | 5.0 | 5.0 |
| Sodium hydroxide | to give pH 8.5 | | |
| Water | to give 53.0% by weight dry solids | | |

Clay 2 was a kaolin clay having a platey particle shape (an aspect ratio of about 50) and a particle size distribution such that 68% by weight consisted of particles having an equivalent spherical diameter smaller than 2 μm and 45% by weight consisted of particles having an equivalent spherical diameter smaller than 1 μm.

The cetyl alcohol was added in the form of an aqueous emulsion which was prepared as described in Example 1 above.

Clay 1 arid Talc 1 were as in Example 1.

These compositions were coated on to a rotogravure base paper of weight 39 g.m$^{-2}$, and the coated sheets conditioned, calendered and tested as described in Example 1 above.

The results of the tests which corresponded to a coat weight of 7 g.m$^{-2}$ were found by interpolation, except for the coefficient of friction results which were each found by measurements at a coat weight which was as near as possible to 8 g.m$^2$. The results obtained are set forth in Table 4 below:

TABLE 4

| Composition | Gloss | Coefficient of Friction | % Missing Dots | Print Density |
|---|---|---|---|---|
| F | 49 | 0.263 | 2.6 | 1.95 |
| G | 51 | 0.243 | 2.3 | 1.94 |
| H | 54 | 0.235 | 1.5 | 1.92 |

EXAMPLE 3

Three further paper coating compositions (I and K comparative and J being in accordance with the invention) were prepared according to the recipes given in Table 5 below:

TABLE 5

| | I | J | K |
|---|---|---|---|
| Clay 1 | 100 | 100 | 100 |
| Styrene-butadiene latex adhesive | 5.0 | 5.0 | 5.0 |
| Stearic acid | 0 | 3.8 | 0 |
| Calcium stearate | 0 | 0 | 2.0 |
| Sodium hydroxide | to give pH 8.5 | 0 | to give pH 8.5 |
| Water | to 57.0% by weight dry solids | | |

In the case of composition J, the stearic acid was added in the form of an aqueous emulsion which was prepared by following exactly the same procedure as was described in Example 1 in connection with cetyl alcohol. The pH was not adjusted from its natural value of approximately 6.5.

These compositions were coated on to a rotogravure base paper of weight 39 g.m$^{-2}$, and the coated sheets conditioned, calendered and tested as described in Example 1 above.

The results of the tests which corresponded to a coat weight of 7 g.m$^{-2}$ were found by interpolation, except for the coefficient of friction results which were each found by measurements at a coat weight which was as near as possible to 7 g.m$^{-2}$. The results obtained are set forth in Table 6 below:

TABLE 6

| Composition | Gloss | Coefficient of Friction | % Missing Dots | Print Density |
|---|---|---|---|---|
| I | 48 | 0.27 | 3.6 | 1.95 |
| J | 53 | 0.20 | 1.5 | 1.83 |
| K | 50 | 0.22 | 3.4 | 1.93 |

These results clearly show the superior rotogravure print performance of the composition containing the stearic acid emulsion compared with the composition containing calcium stearate.

EXAMPLE 4

Three paper coating compositions (L and N comparative and M being in accordance with the invention) were prepared according to the recipes given in Table 7 below:

TABLE 7

| Composition | L | M | N |
|---|---|---|---|
| Clay 1 | 85 | 100 | 100 |
| Talc 1 | 15 | 0 | 0 |
| Sodium dodecyl sulphate | 0 | 1.0 | 0.5 |
| Antifoamer 1 | 0 | 0.2 | 0 |
| Antifoamer 2 | 0 | 0 | 0.2 |
| Styrene butadiene latex adhesive | 5.0 | 5.0 | 5.0 |
| Sodium hydroxide | to give pH 8.5 | | |
| Water | to give 57.0% by weight solids | | |

The amount of each pigment is given in parts by weight of the total pigment. The amount of the latex adhesive is given as the percentage by weight of latex solids, based on the weight of the dry pigment. The amounts of sodium dodecyl sulphate and antifoamers is the percentage by weight, based on the weight of the dry pigment.

Clay 1 and Talc 1 were as in Example 1.

Antifoamers 1 was a suspension of fine silica in a silicone oil, marketed under the trade name "MSA".

Antifoamers 2 was marketed under the trade name "FOMEGON 212", and comprised a mixture of a hydrotreated naphthenic oil, ethylene bis-stearamide, a chlorinated paraffin and hydrophobic silica, supplied as a 15% active emulsion in water.

The compositions were applied to a rotogravure base paper of weight 39 g.m$^{-2}$, using a laboratory coating machine of the type described in British Patent Specification No. 1032536 at a paper speed of 400 m.min$^{-1}$ and a blade holder angle of 45°. Coatings were applied to sheets of the base paper at different weights per unit are in the range from about 5 to 10 g.m$^{-2}$ by adjusting the loading on the blade. Each sheet of coated paper was conditioned for 24 hours at 23° C. and 50% relative humidity, and were then calendered by 10 passes through a Perkins laboratory supercalender at a temperature of 65° C., a pressure of 69 bar and a speed of 36 m.min$^{-1}$. The sheets of calendered coated paper were tested for gloss, coefficient of friction, gravure print quality (% missing dots) and print density, the results in each case being plotted graphically against coat weight, and the result corresponding to a coat weight of 7 g.m$^{-2}$ being found by interpolation. The results obtained are set forth in Table 8 below:

TABLE 8

| Composition | Gloss | Coefficient of Friction | % Missing Dots | Print Density |
| --- | --- | --- | --- | --- |
| L | 58 | 0.235 | 1.5 | 1.94 |
| M | 58 | 0.250 | 1.4 | 1.90 |
| N | 58 | 0.264 | 1.5 | 1.84 |

EXAMPLE 5

Three paper coating compositions O, P, Q (O and Q being comparative, P being in accordance with the second aspect of the invention) were prepared according to the recipes given in Table 9 as follows.

TABLE 9

| Composition | O | P | Q |
| --- | --- | --- | --- |
| Clay 1 | 65 | 65 | 52 |
| Clay 3 | 35 | 35 | 28 |
| Talc 1 | 0 | 0 | 20 |
| Sodium dodecyl sulphate | 0 | 1.0 | 0 |
| Antifoamer 3 | 0 | 0.1 | 0 |
| Styrene-acrylic (alkali-swellable) latex adhesive | 5.0 | 5.0 | 5.0 |
| Sodium hydroxide | to give pH 8.5 | | |
| Water | to give 57.0% by weight solids | | |

Clay 3 was a kaolin clay having a particle size distribution such that 80% by weight consisted of particles having an equivalent spherical diameter smaller than 2 μm and 62% by weight consisted of particles having an equivalent spherical diameter smaller than 1 μm.

Antifoamer 3 was a 30% active emulsion in water of a silicone based compound.

These compositions were coated on to base paper, and the coated sheets conditioned, calendered and tested as described in Example 1 above.

The results of the tests which corresponded to a coat weight: of 7 g.m$^{-2}$ were found by interpolation, except for the coefficient of friction results which were each found by measurements at a coat weight which was as near as possible to 8 g.m$^{-2}$. The results obtained are set forth in Table 10 below.

TABLE 10

| Composition | Gloss | Coefficient of Friction | % Missing Dots | Print Density |
| --- | --- | --- | --- | --- |
| O | 50 | 0.263 | 2.7 | 1.95 |
| P | 53 | 0.231 | 1.9 | 1.81 |
| Q | 51 | 0.243 | 2.5 | 1.94 |

EXAMPLE 6

Four paper coating compositions (R comparative, S, T and U embodying the invention) were prepared according to the recipes given in Table 11 below:

TABLE 11

| Composition | R | S | T | U |
| --- | --- | --- | --- | --- |
| Clay 1 | 100 | 100 | 100 | 100 |
| Sodium dodecyl sulphate | 0 | 1.0 | 1.0 | 1.0 |
| Antifoamer 3 | 0 | 0 | 0.1 | 0 |
| Antifoamer 4 | 0 | 0 | 0 | 0.15 |
| Styrene butadiene latex adhesive | 5.0 | 5.0 | 5.0 | 5.0 |
| Sodium hydroxide | to give pH 8.5 | | | |
| Water | to give 57.0% by weight solids | | | |

Antifoamer 4 was a 100% active silicone compound.

These compositions were coated on to base paper, and the coated sheets conditioned, calendered and tested as described in Example 1 above.

The results of the tests which corresponded to a coat weight of 7 g m$^{-2}$ were found by interpolation and are set forth in Table 12 below:

TABLE 12

| Composition | Gloss | Coefficient of Friction | % Missing Dots | Print Density |
| --- | --- | --- | --- | --- |
| R | 54 | 0.274 | 3.5 | 1.87 |
| S | 56 | 0.271 | 2.5 | 1.81 |
| T | 56 | 0.235 | 2.3 | 1.83 |
| U | 56 | 0.246 | 2.5 | 1.83 |

EXAMPLE 7

Two paper coating compositions (V comparative and W in accordance with the invention) were prepared according to the recipes given in Table 13 below:

TABLE 13

| Composition | V | W |
| --- | --- | --- |
| Clay 1 | 100 | 100 |
| Sodium dodecyl sulphate | 0 | 1.0 |
| Antifoamer 1 | 0 | 0.2 |
| Low molecular weight acrylic thickener | 0.25 | 0.25 |
| Sodium hydroxide | to give pH 8.5 | |
| Water | to give 57.0% by weight solids | |

The compositions were coated on to a rotogravure base paper of weight per unit area 34 g m$^{-2}$ using the same laboratory coating machine as described in Example 1 at a paper speed of 1400 m.min$^{-1}$ and at a blade holder angle of 45°. The coated sheets were conditioned, calendered and tested as described in Example 1 above.

The results of the tests which corresponded to a coat weight of 7 g.m$^{-2}$ were found by interpolation and are set forth in Table 14 below:

TABLE 14

| Composition | Gloss | Coefficient of Friction | % Missing Dots | Print Density |
|---|---|---|---|---|
| V | 48 | 0.262 | 3.2 | 1.97 |
| W | 50 | 0.247 | 2.2 | 1.83 |

We claim:

1. A method of producing a composition for coating fibrous sheet products which includes the steps of:
   (a) preparing a dispersed aqueous suspension of an inorganic particulate pigment material comprising kaolin in an aqueous medium which includes a polycarboxylate dispersing agent for the pigment material in the suspension;
   (b) preparing an aqueous emulsion or solution of a surface treatment agent for the pigment material, the surface treatment agent having a hydrophobic group and being present in a substantially free state and being selected from the group consisting:
      (i) long chain fatty acids;
      (ii) long chain fatty alcohols having from 8 to 18 carbon atoms in their hydrocarbon chain and
      (iii) anionic surfactants having a long chain hydrophobic group and a polar group;
   (c) adding with mixing the aqueous emulsion or solution of the surface treatment agent prepared in step (b) to the dispersed aqueous suspension prepared in step (a); and
   (d) adding during or after step (c) to the dispersed suspension and the surface treatment agent a hydrophilic adhesive.

2. A method as in claim 1 and wherein the surface treatment agent is a surfactant and an anti-foaming agent is present in the application of step (d).

3. A method as in claim 2, wherein the dispersing agent comprises a polyacrylate.

4. A method of claim 1 wherein the surface treatment agent comprises a fatty acid or a fatty alcohol and step (b) includes an emulsifying agent.

5. A method as in claim 4, wherein the dispersing agent comprises a polyacrylate.

6. A method as in claim 1, wherein the dispersing agent comprises a polyacrylate.

7. A method of claim 1 wherein the adhesive is present in an amount of from 3% to 30% by weight based on the dry weight of the pigment material.

8. A method of claim 1 wherein the solids content of the coating composition following step (d) is at least 55% by weight.

9. A method of producing a coated cellulosic sheet member which includes the steps of:
   (a) preparing a dispersed aqueous suspension of an inorganic particulate material comprising kaolin in an aqueous medium which includes a polycarboxylate dispersing agent for the pigment material in the suspension;
   (b) preparing an aqueous emulsion or solution of a surface treatment agent for the pigment, the surface treatment agent having a hydrophobic group and being present in a substantially free state and being selected from the group consisting of:
      (i) long chain fatty acids;
      (ii) long chain fatty alcohols having from 8 to 18 carbon atoms in their hydrocarbon chain; and
      (iii) anionic surfactants having a long chain hydrophobic group and a polar group;
   (c) adding with mixing the aqueous emulsion or solution of the surface treatment agent prepared in step (b) to the dispersed aqueous suspension prepared in step (a);
   (d) adding during or after step (c) to the dispersed aqueous suspension and the surface treatment agent a hydrophilic adhesive; and
   (e) coating a cellulosic sheet member with the composition produced in steps (d).

10. A method of producing a printed coated cellulosic sheet member which includes the steps of:
    (a) preparing a dispersed aqueous suspension of an inorganic particulate material comprising kaolin in an aqueous medium which includes a polycarboxylate dispersing agent for the pigment material in the suspension;
    (b) preparing an aqueous emulsion or solution of a surface treatment agent for the pigment, the surface treatment agent having a hydrophobic group and being present in a substantially free state and being selected from the group consisting of:
       (i) long chain fatty acids;
       (ii) long chain fatty alcohols having from 8 to 18 carbon atoms in their hydrocarbon chain; and
       (iii) anionic surfactants having a long chain hydrophobic group and a polar group;
    (c) adding with mixing the aqueous emulsion or solution of the surface treatment agent prepared in step (b) to the dispersed aqueous suspension prepared in step (a);
    (d) adding during or after step (c) to the dispersed aqueous suspension and the surface treatment agent a hydrophilic adhesive;
    (e) coating a cellulosic sheet member with the composition produced in steps (d) to produce a coating layer on a surface thereof; and
    (f) printing on the coating layer by a gravure printing process.

* * * * *